United States Patent
Gouache et al.

(10) Patent No.: US 10,735,544 B2
(45) Date of Patent: Aug. 4, 2020

(54) METHOD FOR PROVIDING A CONTENT PART OF A MULTIMEDIA CONTENT TO A CLIENT TERMINAL, CORRESPONDING CACHE

(71) Applicant: INTERDIGITAL VC HOLDINGS, INC., Wilmington, DE (US)

(72) Inventors: Stephane Gouache, Cesson Sevigne (FR); Guillaume Bichot, La Chapelle Chaussee (FR); Francoise Le Bolzer, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 179 days.

(21) Appl. No.: 15/110,210

(22) PCT Filed: Jun. 12, 2014

(86) PCT No.: PCT/EP2014/062215
§ 371 (c)(1),
(2) Date: Jul. 7, 2016

(87) PCT Pub. No.: WO2015/104070
PCT Pub. Date: Jul. 16, 2015

(65) Prior Publication Data
US 2016/0330289 A1 Nov. 10, 2016

(30) Foreign Application Priority Data
Jan. 7, 2014 (EP) .................................. 14305015

(51) Int. Cl.
*G06F 15/167* (2006.01)
*H04L 29/08* (2006.01)
(Continued)

(52) U.S. Cl.
CPC ...... *H04L 67/2842* (2013.01); *H04L 65/4084* (2013.01); *H04L 65/605* (2013.01);
(Continued)

(58) Field of Classification Search
CPC ......................... H04L 67/2842; H04L 65/4084
(Continued)

(56) References Cited

U.S. PATENT DOCUMENTS

| 6,820,114 B2 * | 11/2004 | Brendle | G06F 16/9574 |
| | | | 709/213 |
| 7,085,894 B2 * | 8/2006 | Krissell | G06F 12/0888 |
| | | | 709/207 |

(Continued)

FOREIGN PATENT DOCUMENTS

| EP | 2410744 | 1/2012 |
| EP | 2819368 | 12/2014 |

(Continued)

OTHER PUBLICATIONS

Akihiro Fujimoto, High Quality Streaming using Disjoint Paths under Hierarchical Cache-serversEnvironment, Feb. 28, 2013IEICE technical report, p. 237-242, vol. 112,No. 463.
(Continued)

Primary Examiner — Anthony Mejia
(74) Attorney, Agent, or Firm — Volpe and Koenig, P.C.

(57) ABSTRACT

Method for providing a content part of a multimedia content to a client terminal, corresponding cache. According to the invention, the method for providing a content part of a multimedia content to a client terminal, one or more caches being arranged along the transmission path between the client terminal and a remote server, several representations of said content part being available, comprises: —receiving (S0) at a first cache (R), from the client terminal, a request for a given representation of said content part belonging to
(Continued)

a set of allowable representations selected among said available representations of the content part, said request further comprising a list of alternative representations of the set and auxiliary information for specifying the scope of the request; —checking (S1) at said first cache (R) if said given representation is stored in the cache; —in case said given representation is not cached, browsing (S2) at said first cache (R) alternative representations listed.

14 Claims, 2 Drawing Sheets

(51) Int. Cl.
*H04L 29/06* (2006.01)
*H04N 21/231* (2011.01)
*H04N 21/845* (2011.01)

(52) U.S. Cl.
CPC .............. *H04L 65/80* (2013.01); *H04L 67/02* (2013.01); *H04L 67/101* (2013.01); *H04L 67/2885* (2013.01); *H04N 21/23106* (2013.01); *H04N 21/8456* (2013.01)

(58) Field of Classification Search
USPC ......................................................... 709/213
See application file for complete search history.

(56) References Cited

U.S. PATENT DOCUMENTS

| | | | | |
|---|---|---|---|---|
| 7,159,013 | B2* | 1/2007 | Cudd | G06F 16/9574 709/217 |
| 8,799,409 | B2* | 8/2014 | Kasten | G06F 12/0873 709/219 |
| 8,819,187 | B1* | 8/2014 | Hofmann | H04L 67/2814 709/219 |
| 8,977,704 | B2* | 3/2015 | Liu | H04N 21/6377 709/213 |
| 9,325,639 | B2* | 4/2016 | Zaifman | H04L 49/552 |
| 9,621,399 | B1* | 4/2017 | Parakh | H04L 29/06047 |
| 9,729,603 | B2* | 8/2017 | Beck | H04N 21/8456 |
| 2003/0187917 | A1* | 10/2003 | Cohen | H04L 67/1095 709/203 |
| 2003/0217113 | A1 | 11/2003 | Katz et al. | |
| 2004/0044740 | A1 | 3/2004 | Cudd et al. | |
| 2008/0195761 | A1 | 8/2008 | Jabri et al. | |
| 2009/0094224 | A1* | 4/2009 | Ricket | G06F 16/951 |
| 2011/0058490 | A1* | 3/2011 | Mills | H04L 12/1886 370/252 |
| 2011/0153719 | A1* | 6/2011 | Santoro | H04L 29/12066 709/203 |
| 2012/0110113 | A1* | 5/2012 | Lee | H04L 67/2852 709/214 |
| 2012/0194534 | A1 | 8/2012 | Benno et al. | |
| 2012/0284371 | A1 | 11/2012 | Begen et al. | |
| 2013/0031060 | A1* | 1/2013 | Lowery | H04L 67/1095 707/689 |
| 2013/0173737 | A1 | 7/2013 | Liu et al. | |
| 2014/0089594 | A1* | 3/2014 | Long | H04L 29/08729 711/133 |
| 2014/0140536 | A1* | 5/2014 | Serletic, II | G06F 3/0481 381/98 |
| 2015/0081926 | A1* | 3/2015 | White | H04L 67/1008 709/245 |
| 2016/0048450 | A1* | 2/2016 | Ostrowski | H04L 67/2842 714/6.3 |

FOREIGN PATENT DOCUMENTS

| | | |
|---|---|---|
| JP | 2006171822 | 6/2006 |
| JP | 2013069073 | 4/2013 |
| JP | 2014511519 | 5/2014 |
| WO | WO20120107341 | 8/2012 |

OTHER PUBLICATIONS

Vijay_Kumar_Adhikari_et_Al_Where_Do_You_Tube.
Krishnappa_Dilip_Kumar_et_Al_DASHing_YouTube_an_Analysis_of_using_DASH_in_YouTube_video_service.
Adhikari et al., "Vivisecting YouTube: An Active Measurement Study", 31st IEEE International Conference on Computer Communications, Orlando, Florida, USA, Mar. 25, 2012, pp. 2521-2526.
Stockhammer, "CE Report on SAND", International Organization for Standardization, ISO/IEC JTC1/SC29/WG11, Coding of Moving Pictures and Audio,107th MPEG Meeting, San Jose, California, USA, San Jose, California, USA, Jan. 13, 2014, pp. 1-22.
Chen et al., "Efficient methods for formally verifying safety properties of hierarchical cache coherence protocols", Formal Methods in System Design, vol. 36, No. 1, Feb. 2010, pp. 37-64.
Taibi et al., "Making DASH cache friendly", International Organization for Standardization, ISO/IEC JTC1/SC29/WG11, Coding of Moving Pictures and Audio, 107th MPEG Meeting, San Jose, California, USA, Jan. 13, 2014, pp. 1-8.
Adhikari et al., "Where Do You "Tube"? Uncovering YouTube Server Selection Strategy", International Conference on Computer Communication Networks, Maui, Hawaii, USA, Jul. 31, 2011, pp. 1-6.
Krishnappa et al., "DASHing YouTube: An Analysis of Using DASH in YouTube Video Service", 38th IEEE Conference on Local Computer Networks, Sydney, Australia, Oct. 21, 2013, pp. 407-415.
Hong et al., "A chunk-based caching algorithm for streaming video", NET-COOP 2010—4th Workshop on Network Control and Optimization, Gent, Belgium, Nov. 2010, pp. 1-9.
Rejaie et al., "Multimedia Proxy Caching Mechanism for Quality Adaptive Streaming Applications in the Internet", 19th Annual Joint Conference of the IEEE Computer and Communications Societies, Tel Aviv, Isreal, Mar. 26, 2000, pp. 980-989.
Sanchez et al., "Efficient HTTP-based streaming using Scalable Video Coding", Signal Processing: Image Commuication, vol. 27, Jan. 2012, pp. pp. 329-342.
Anonymous, "Cache-Control", https://fr.wikipedia.org/wiki/Cache-Control, Apr. 18, 2016, pp. 1-4.
Fielding et al., "Hypertext Transfer Protocol—HTTP/1.1", Network Working Group, Request for Comments: 2616, Jun. 1999, pp. 1-155.

* cited by examiner

METHOD FOR PROVIDING A CONTENT PART OF A MULTIMEDIA CONTENT TO A CLIENT TERMINAL, CORRESPONDING CACHE

This application claims the benefit, under 35 U.S.C. § 365 of International Application of PCT/EP14/062215, filed Jun. 12, 2014, which was published in accordance with PCT Article 21(2) on Jul. 16, 2015, in English, and which claims the benefit of European patent application No. 14305015.1, filed Jan. 7, 2014.

FIELD OF THE INVENTION

The present invention relates generally to the domain of the adaptive streaming technology over, for instance but not exclusively, HTTP (HyperText Transfer Protocol) and, in particular, to a method for providing a content part of a multimedia content to a client terminal, a cache being arranged along the transmission path between the client terminal and a remote server.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Adaptive streaming over HTTP (also called multi-bitrate switching) is quickly becoming a major technology for multimedia content distribution. Among the HTTP adaptive streaming protocols which are already used, the most famous are the HTTP Live Streaming (HLS) from Apple, the Silverlight Smooth Streaming (SSS) from Microsoft, the Adobe Dynamic Streaming (ADS) from Adobe and the Dynamic Adaptive Streaming over HTTP (DASH) developed by 3GPP within the SA4 group.

When a client terminal wishes to play an audiovisual content (or A/V content) in adaptive streaming, it first has to get a file describing how this A/V content might be obtained. This is generally done through the HTTP protocol by getting a descripting file, so-called manifest, from an URL (Uniform Resource Locator), but can be also achieved by other means (e.g. broadcast, e-mail, SMS and so on). The manifest basically lists the available representations (also called instances or versions) of such an A/V content (in terms of bitrate, resolution and other properties); one representation per quality level (bitrate). Each representation is made of a series of chunks of equal duration—accessible by a separate URL—and has a set of descriptive elements attached for selection by the client. Said manifest is generated in advance and delivered to the client terminal by, for instance, a remote server.

Indeed, the stream of data corresponding to the A/V content is available on an HTTP server with different qualities. The highest quality is associated with a high bitrate; the lowest quality is associated with a low bitrate. This allows distribution to many different terminals which might be subject to highly varying network conditions.

The whole data stream of each representation is divided into chunks of equal duration which are made such that a client terminal may smoothly switch from one quality level to another between two chunks. As a result, the video quality may vary while playing but rarely suffers from interruptions (also called freezes).

At the client side, the chunks are selected based on a measure of the available bandwidth of the transmission path. In particular, a client terminal usually requests the representation of a chunk corresponding to a bitrate encoding and thus a quality compliant with the measured bandwidth.

When a cache is along the transmission path between a client terminal and a remote server which frequently occurs, one representation of a given chunk may already be stored in said cache, in case another client has previously requested the same chunk with the same representation or in case a Content Delivery Network (CDN) has already provisioned the chunk in the cache. Thus, the response to an HTTP request for said given chunk is faster than if the chunk comes from the remote server and duplicate transmission can be avoided, effectively saving network resources.

Nevertheless, the HTTP adaptive streaming appears not to be cache friendly (or at least less cache friendly than the so called layered base switching as for instance H264-SVC). Indeed, if a first client terminal requests a representation r of a given chunk and a second client terminal—sharing a part of the transmission path with said first client terminal and a cache—requests a representation r' of said given chunk (at a higher or lower quality), then the cache is not hit leading to higher load on the network segment between the cache and the server with the risk of causing congestion. The benefits of caching are then completely annihilated and caches are currently unable to improve this situation.

The present invention focuses on preventing network congestions and, in particular, attempts to operate caches possibly located along the transmission path between a client terminal and one or several remote servers.

SUMMARY OF THE INVENTION

The invention concerns a method for providing a content part of a multimedia content to a client terminal, one or more caches being arranged along the transmission path between the client terminal and a remote server, several representations of said content part being available, which is remarkable in that it comprises:
  receiving at a first cache, from the client terminal, a request for a given representation of said content part, belonging to a set of allowable representations selected among, said request further comprising a list of alternative representations of the set and auxiliary information for specifying the scope of the request;
  checking at said first cache if said given representation is stored in the cache;
  in case said given representation is not cached, browsing at said first cache alternative representations listed.

Thus, thanks to the present invention, it is possible to decrease the end-to-end traffic between a client terminal (i.e. an HTTP adaptive streaming client terminal) and the corresponding origin server by means of caching, that is increasing the number of cache hits. To this end, a cache is configured to support a directive of the request sent by a client terminal, so that it can fetch alternative representations included in this directive when the given representation is not cached. It can then lead to less traffic between the client terminal and the original server and, as a consequence, less congestion. Thus, the present invention can provide a better user experience to the end user, as limiting the need to download chunks from the server.

In a first aspect of a preferred embodiment, said auxiliary information can define the number of remaining caches arranged between the client and the server which are allowed to forward said request to a next cache, in case said given representation and said alternative representations are not stored.

In particular, an error message may be sent to the client when the last cache of the remaining caches is devoid of said given representation and said alternative representations.

In a second aspect of the preferred embodiment, said auxiliary information can define a final cache arranged along the transmission path, so that the request is not forwarded by said final cache, in case said given representation and said alternative representations are not stored in the latter.

Advantageously, an error message can be sent to the client when said final cache is devoid of said given representation and said alternative representations.

In addition, the alternative representations is preferably browsed in order of preference, said alternative representations being listed, for instance, in order of decreasing preference.

In addition, each alternative representation has preferably a corresponding bitrate lower than the one of the given representation. Naturally, in a variant, at least one alternative representation might have a corresponding bitrate higher than the one of the given representation.

Moreover, each allowable representation of the set can advantageously have a corresponding bitrate at most equal to the bandwidth of the transmission path between the client terminal and the remote server.

In another aspect of the preferred embodiment, the transmission protocol used being HTTP, the request is an HTTP request and the Cache Control extension of said HTTP request comprises the list of the alternative representations.

In a variant or as a complement, said request can comprise additional information, such that the cache returns the requested representation or a listed alternative representation, if cached, or a response message in case neither the given representation nor any of the listed alternative representations is cached.

In particular, when the transmission protocol used is HTTP, said additional information is included within the cache control extension of said HTTP request.

Furthermore, the present invention also concerns a cache configured for providing a content part of a multimedia content to a client terminal, said cache being arranged along the transmission path between the client terminal and a remote server, several representations of said content part being available.

According to the present invention, said cache comprises:
- an interface module for receiving, from the client terminal, a request for a given representation of said content part belonging to a set of allowable representations selected among said available representations, said request further a list of alternative representations of the set and auxiliary information specifying the scope of the request;
- a controlling module for checking if said given representation is stored;
- a browsing module formed to browse alternative representations listed, in case said given representation is not cached.

Preferably, the alternative representations can be browsed in order of preference.

In a first aspect of a preferred embodiment, auxiliary information defining the number of remaining caches arranged between the client and the server which are allowed to forward said request to a next cache in case said given representation and said alternative representations are not stored, the request is preferably not forwarded when, at said cache, the number of remaining caches is equal to zero.

In a further aspect of the preferred embodiment, auxiliary information defining a final cache arranged along the transmission path, the request is preferably not forwarded in case:
- said given representation and said alternative representations are not stored in said cache; and
- said cache corresponds to the final cache.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way imitative, with reference to the appended figures on which:

In FIGS. 1 to 3, the represented blocks are purely functional entities, which do not necessarily correspond to physically separate entities. Namely, they could be developed in the form of software, hardware, or be implemented in one or several integrated circuits, comprising one or more processors.

Wherever possible, the same reference numerals will be used throughout the figures to refer to the same or like parts.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

According to a preferred embodiment, the present invention is depicted with regard to the HTTP adaptive streaming protocol. Naturally, the invention is not restricted to such a particular environment and other adaptive streaming protocol could of course be considered and implemented.

Figure 1:
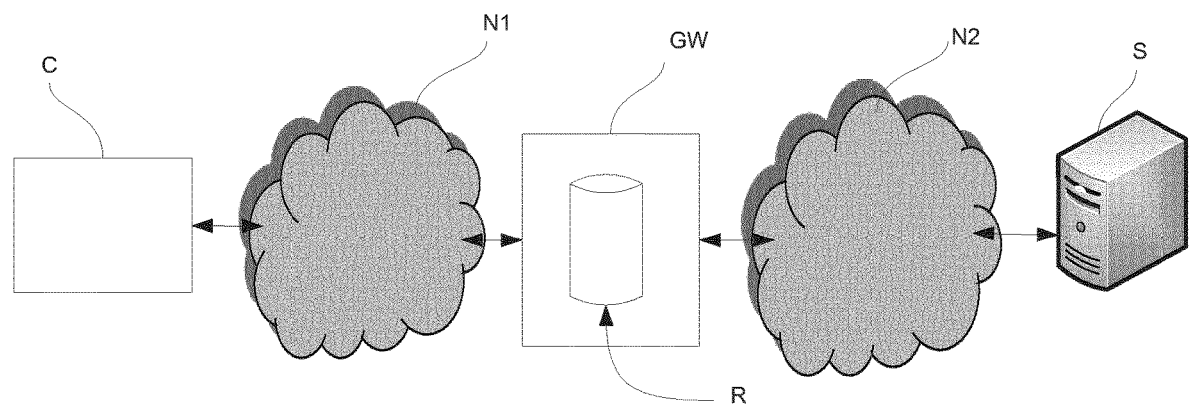
FIG. 1 is a schematic diagram of a Client-Server network architecture wherein the present invention might be implemented.

As depicted in FIG. 1, the Client-Server network architecture, wherein the present invention might be implemented, comprises a client terminal C, a gateway GW and one or more HTTP servers S (only one is represented on FIG. 1).

The client terminal C—connected to the gateway GW through a first network N1 (such as a home network or an enterprise network)—may wish to request a multimedia content stored on a remote server S through a second network N2 (such as the Internet network). The first network N1 is connected to the second network N2 thanks to the gateway GW.

The HTTP server S streams chunks to the client terminal C, upon the client request, using HTTP adaptive streaming protocol over one or more TCP/IP connections.

Figure 2:
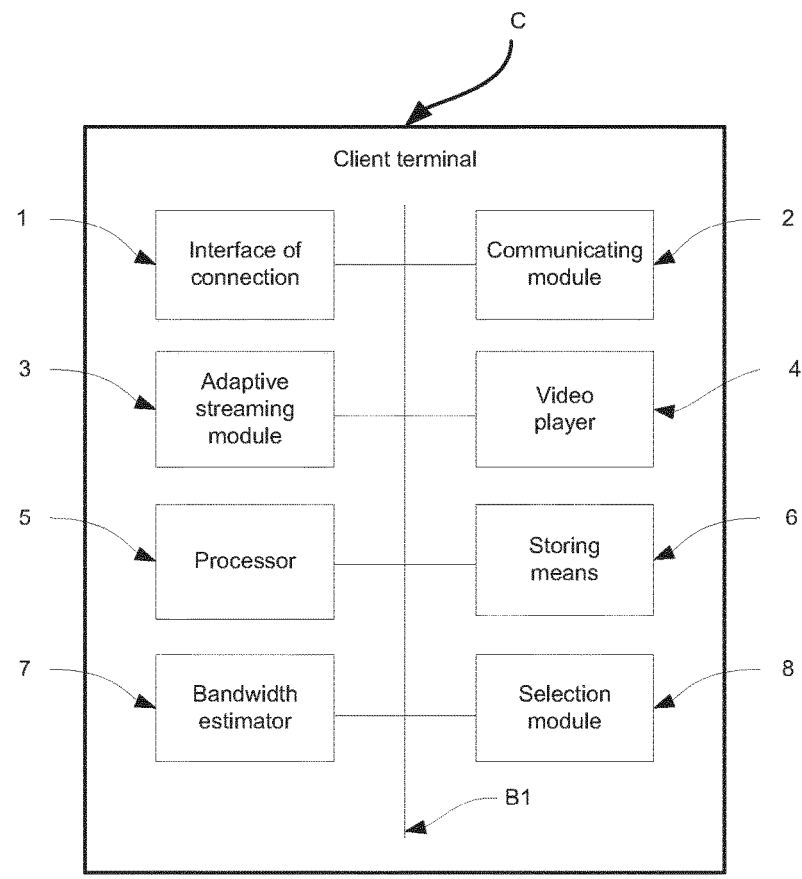
FIG. 2 is a block diagram of an example of a client terminal according to a preferred embodiment of the present invention.

According to the preferred embodiment as described in FIG. 2, the client terminal C comprises at least:
- an interface of connection 1 (wired and/or wireless, as for example Wi-Fi, Ethernet, etc.) to the first network N1;
- a communication module 2 containing the protocol stacks to communicate with the HTTP server S. In particular, the communication module 2 comprises the TCP/IP stack well known in the art. Of course, it could be any other type of network and/or communicating means enabling the client terminal C to communicate with the HTTP server S;
- an adaptive streaming module 3 which receives the HTTP streaming multimedia content from the HTTP server S. It continually selects the representation of a chunk whose the corresponding bitrate better matches constraints as described hereinafter;
- a video player 4 adapted to decode and render the multimedia content;
- one or more processor(s) 5 for executing the applications and programs stored in a non-volatile memory of the client terminal C;
- storing means 6, such as a volatile memory, for buffering the chunks received from the HTTP server S before their transmission to the video player 4;
- an internal bus B1 to connect the various modules and all means well known to the skilled in the art for performing the generic client terminal functionalities.

As an example, the client terminal C is a portable media device, a mobile phone, a tablet or a laptop. Naturally, the client terminal C might not comprise a complete video player, but only some sub-elements such as the ones for demultiplexing and decoding the media content and might rely upon an external means to display the decoded content to the end user. In this case, the client terminal C is a HTTP Adaptive Streaming (HAS) capable video decoder, such as a set-top box.

According to the preferred embodiment as described in FIG. 1, the gateway GW comprises a cache R, which is arranged along the transmission path between the client terminal C and a server S. In a variant, said cache R might be arranged in a proxy of the first network N1 or in any other location along the transmission path.

In the following, it is assumed that the client terminal C requests an HTTP Adaptive Streaming (HAS) multimedia content to the remote server S, said HAS multimedia content being available in several representations made of a series of chunks. The quality of each representation should be understood as related to media encoding quality, media encoding type (e.g. 2D versus 3D), media encoding color scheme, etc. . . .

To this end, as shown in FIG. 2, the client terminal C further comprises:
- a bandwidth estimator 7 configured for estimating the bandwidth of the transmission path;
- a selection module 8 configured for determining a set of allowable representations the client terminal C might request. The allowable representations are selected among the available representations of a given chunk $I_n$ of the multimedia content, as listed in the associated manifest. In particular, the determination—by the module 8—of the set of allowable representations of the given chunk $I_n$ can be based on one or several performance criteria as for instance:
  - the bandwidth estimated by the estimator 7;
  - the capabilities of the client terminal C;
  - the representation of the previously requested chunk $I_{n-1}$;
  - the quality of experience required by an end user of the client terminal C.

Obviously, the selection module 8 might be, in a variant, integrated within the adaptive streaming module 3.

It might be appreciated that the meaning of <<allowable>> representations depends on the implementation. Indeed, it may mean upgraded or downgraded quality representations of a given chunk $I_n$ by comparison with the representation of the previously requested chunk $I_{n-1}$.

If the requested representation of a given chunk $I_n$ has a corresponding quality significantly lower (i.e. visible by an end user) than the one of the representation of the previously requested chunk $I_{n-1}$, the selection module 8 might be configured not to attempt to further downgrade the quality in operating potential cached chunk, except if constrained by the available bandwidth.

In an illustrative but non-limitative example compliant with the present invention, the allowable representations of a given chunk $I_n$ (selected from the available representations listed in the manifest) have a corresponding bitrate (related to a given quality) at most equal to the estimated bandwidth. In addition, the bitrate of allowable representations of the set might also be at least equal to a defined threshold, under which quality is not acceptable by an end user of the client terminal C.

Obviously, as a variant or as a complement, the determined set of allowable representations can comprise one or more representations with a bitrate higher than the estimated bandwidth, in order to try to fetch a representation already stored in the cache R.

Besides, the adaptive streaming module 3 is configured to request a preferred representation r of a given chunk $I_n$ of the HAS multimedia content, from the set of allowable representations. For instance, the preferred representation r of the chunk $I_n$ might correspond to the representation having an associated bitrate just lower than the estimated bandwidth.

To this end, the communication module 2 sends an HTTP request wherein the Cache Control extension of its header comprises the directive "altlist", which allows the client terminal C to list, in order of preference or priority, alternative representations r' that can be returned by cache R in case the preferred representation r is not cached.

The alternative representations r' of the "altlist" directive preferably correspond to the allowable representations of the determined set. Obviously, additional representations (for instance, having a bitrate higher than the estimated bandwidth) might be added.

Hereinafter is an example of such an HTTP request including the "altlist" directive:
GET/hi/fileSequence2681.ts HTTP/1.1
Host: example.com
Cache_Control:altlist=http://example.com/med/fileSequence2681.ts,http://example.com/low/fileSequence2681.ts According to the preferred embodiment, it might be appreciated that the cache R supports the "altlist" directive, meaning that it is configured to interpret its content. Such a cache R is hereinafter called "smart" cache, other caches are called legacy cache (aka they are not smart cache).

Figure 3:
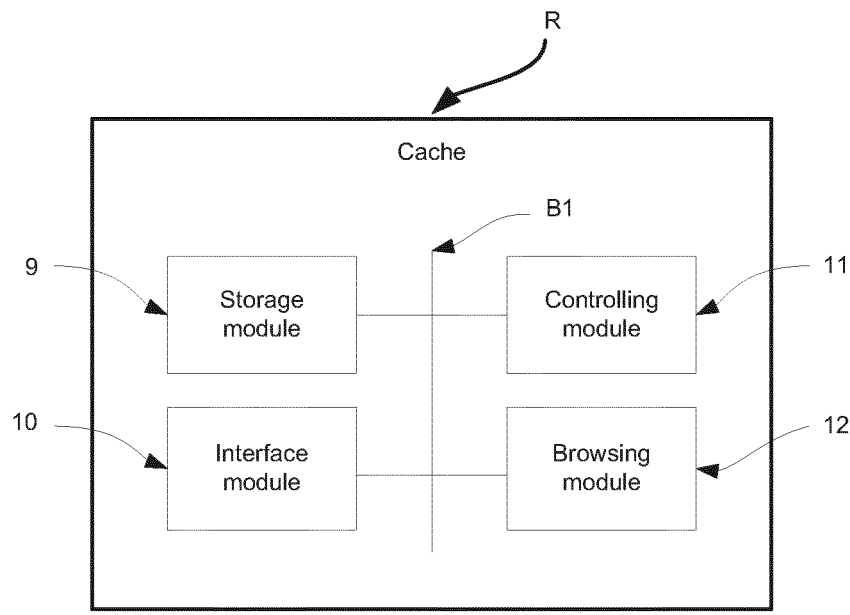
FIG. 3 is a block diagram of an example of a cache according to a preferred embodiment of the present invention.

To this end, according to the preferred embodiment, and as shown in FIG. 3, the smart cache R comprises:

- a storage module 9, such as a volatile memory and/or a permanent memory, for storing chunks of multimedia contents received from one or more servers S before their transmission to the client terminal C, requesting such multimedia contents;
- an interface module 10 configured to receive, from the client terminal C, an HTTP request for a preferred representation r of the content part, said preferred representation r belonging to the set of allowable representations. It is assumed that said HTTP request indicates—within the "altlist" directive—alternative representations r' which might be accepted as replacement by the client terminal C in case the preferred representation r is not cached;
- a controlling module 11 formed to check whether or not the smart cache R already has the requested preferred representation r; and
- a browsing module 12 adapted to browse in order of preference alternative representations listed in the "altlist" directive of the HTTP request sent by the client terminal C, in case the preferred representation r is not cached. In a variant, the controlling module and the browsing module form only one module.

Upon receipt of such an HTTP request for a preferred representation r of a given chunk $I_n$ from the client terminal C, the controlling module 11 of the smart cache R checks whether or not said preferred representation r is cached:

- if cached, the smart cache R returns the preferred representation r to the client terminal C;
- if not cached, the browsing module 12 browses the "altlist" directive of the HTTP request to successively checks, in order of preference, whether or not one alternative representation r' is cached.

When such an alternative representation r' of the "altlist" directive is cached, the smart cache R returns said alternative representation r' to the client terminal C.

In case none of the alternative representations r' of the "altlist directive" is cached, the smart cache R is configured to release the HTTP request sent by the client terminal C towards the server S.

The released HTTP request might then be intercepted by a next cache along the transmission path between the smart cache R and the remote server S, so that, if said next cache is a smart cache, it behaves as the smart cache R. Otherwise (the next cache does not support the "altlist" directive), it might return an error message or might release the HTTP request towards the server S.

In a refinement, the HTTP request—sent by the communication module 2 of the client terminal C—can comprise the auxiliary directive (defining auxiliary information) "Time-To-Live" (TTL) in the Cache Control extension of its header. The "Time-To-Live" directive (also called token) allows the "altlist" directive to be recursive. To this end, the TTL directive is associated with a TTL value defining the number of remaining caches (smart cache or legacy cache) arranged between the client terminal C and the server S which are allowed to forward said request to a next cache, in case said preferred representation and said alternative representations are not stored. In fact, each cache (smart cache or legacy cache) receiving a request from a client terminal will treat it and forward it while decrementing the TTL value of the request. When the TTL value of the request is equal to zero, the request is not forwarded anymore and a response with an error code (for instance 412) may be sent to the client terminal C. Failure reason may be added to said response.

Hereinafter is an example of such an HTTP request including the "altlist" and "TTL" directives:
GET/hi/fileSequence2681.ts HTTP/1.1
Host: example.com
Cache_Control:altlist=http://example.com/med/fileSequence2681.ts,http://example.com/low/fileSequence2681.ts,TTL=3

In a further refinement or in a complement, the HTTP request—sent by the communication module 2 of the client terminal C—can comprise the auxiliary directive "until element" in the Cache Control extension of its header. The "until element" directive is associated with a value (e.g. the IP address of the cache, the Qualified Domain Name, or any other kind of identifier) identifying a final cache.

The "until element" directive operates in a similar way as the TTL directive, except that the HTTP request is not forwarded anymore when it reaches the identified final cache, in case the latter does not comprise the preferred representation or the alternative representations of the "altlist" directive. In that case, a response with error code (for instance 412) is preferably generated and sent to the client terminal C. Failure reason may also be added to the response.

Figure 4:
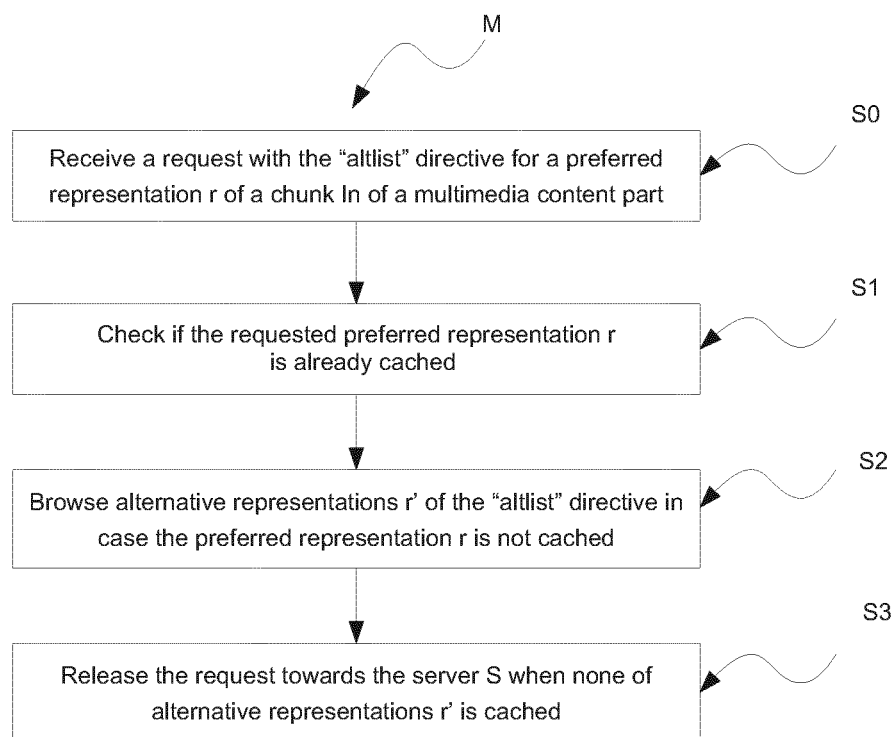
FIG. 4 is a flow chart illustrating the method for retrieving a representation of a given chunk implemented by the cache of FIG. 3.

As illustrated in FIG. 4, according to said preferred embodiment, the cache R is configured to implement the following mechanism M for providing a requested representation of a given chunk $I_n$ of an HAS multimedia content to the client terminal C. Said mechanism M comprises the steps of:

- receiving (step S0), from the client terminal C, an HTTP request for a preferred representation r of the given chunk $I_n$ part belonging to a set of allowable representations as previously defined. The HTTP request further comprises the "altlist" directive listing alternative representations of the set;
- checking (step S1) if the preferred representation r is stored in the storage module 9;
- browsing (step S2), in order of preference, alternative representations r' listed in said "altlist" directive in case the preferred representation r is not cached;
- releasing (step S3) the HTTP request towards the server S when none of the alternative representations r' is cached in the storage module 9 of the smart cache R.

In a variant of the preferred embodiment, the Cache Control extension of an HTTP request, sent by the client terminal C, might further comprise an additional directive (defining additional information), named "only_if_cached". The "altlist" directive keeps priority over the "only_if_cached" directive of the Cache Control header. Hereinafter is an example of such an HTTP request with the above mentioned directives:
GET/hi/fileSequence2681.ts HTTP/1.1
Host: example.com
Cache_Control:only_if_cached,altlist=http://example.com/med/fileSequence2681.ts,http://example.com/low/fileSequence2681.ts In this variant, upon receipt of such an HTTP request (including both directives "only_if_cached" and "altlist") for a preferred representation r of a given chunk $I_n$, the smart cache R checks whether or not said preferred representation r is cached:

if cached, the smart cache R returns the preferred representation r to the client terminal C;

if not cached, the browsing module 12 browses the "altlist" directive of the HTTP request to successively checks, in order of preference, whether or not one alternative representation r' is cached.

When such an alternative representation r' of the "altlist" directive is cached, the smart cache R returns said alternative representation r' to the client terminal C.

In case none of the alternative representations r' of the "altlist directive" is cached, the smart cache R is then configured to return an error message (for instance "http/1.1 504 altlist supported"), thanks to the "only_if_cached" directive, to both indicate that:

the preferred representation r is not cached;

the cache R supports the "altlist" directive, so that it can be derived from the receipt of such an error message that none of the alternative representations r' of the "altlist" directive is cached.

In a further step, the client terminal C might send a new request to the remote server S to retrieve the preferred representation r of the given chunk $I_n$, directly from the server S. To this end, neither the "only_if_cached" directive, nor the "altlist" directive is used in the header of this new request. Obviously, this new request might also comprise only the "altlist" directive, without the "only_if_cached" directive.

References disclosed in the description, the claims and the drawings may be provided independently or in any appropriate combination. Features may, where appropriate, be implemented in hardware, software, or a combination of the two.

Reference numerals appearing in the claims are by way of illustration only and shall have no limiting effect on the scope of the claims.

This invention having been described in its preferred embodiment, it is clear that it is susceptible to numerous modifications and embodiments within the ability of those skilled in the art and without the exercise of the inventive faculty. Accordingly, the scope of the invention is defined by the scope of the following claims.

In the claims hereof, any element expressed as a means for performing a specified function (e.g. adaptive streaming module 3, bandwidth estimator 7, selection module 8, controlling module 11, browsing module 12, etc.) is intended to encompass any way of performing that function including, for example, a) a combination of circuit elements (for instance one or more processors) that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

The invention claimed is:

1. A method for providing a content part of a multimedia content to a client terminal, one or more caches being arranged along the transmission path between the client terminal and a remote server, several representations of said content part being available, comprising:

receiving at a first cache, from the client terminal, a request for a given representation of said content part, belonging to a set of allowable representations selected among said available representations, said request further comprising a list of alternative representations of the set and an auxiliary directive for specifying a number of remaining caches arranged between the client and the server which are allowed to forward said request to a next cache, in case said given representation and said alternative representations are not stored;

checking at said first cache if said given representation is stored in the cache;

in case said given representation is not cached, browsing at said first cache alternative representations listed.

2. The method according to claim 1, wherein an error message is sent to the client when the last cache of the remaining caches is devoid of said given representation and said alternative representations.

3. The method according to claim 1, wherein the auxiliary directive defines a final cache arranged along the transmission path, so that the request is not forwarded by said final cache, in case said given representation and said alternative representations are not stored in the latter.

4. The method according to claim 3, wherein an error message is sent to the client when said final cache is devoid of said given representation and said alternative representations.

5. The method according to claim 1, wherein the alternative representations are browsed in order of preference.

6. The method according to claim 1, wherein each alternative representation has a corresponding bitrate lower than the one of the given representation.

7. The method according to claim 6, wherein each allowable representation of the set has a corresponding bitrate at most equal to the bandwidth of the transmission path between the client terminal and the remote server.

8. The method according to claim 1, wherein, the transmission protocol used being HTTP, the request is an HTTP request and the Cache Control extension of said HTTP request comprises said list of alternative representations.

9. The method according to claim 1, wherein said request comprises additional information, such that the first cache returns the requested representation or a listed alternative representation, if cached, or a response message in case neither the given representation nor any of the listed alternative representations is cached.

10. The method according to claim 9, wherein, when the transmission protocol used is HTTP, said additional information is included within the cache control extension of said HTTP request.

11. A cache configured for providing a content part of a multimedia content to a client terminal, said cache being arranged along the transmission path between the client terminal and a remote server, several representations of said content part being available, comprising:

an interface module for receiving, from the client terminal, a request for a given representation of said content part belonging to a set of allowable representations selected among said available representations, said request further comprising a list of alternative representations of the set and an auxiliary directive for specifying a number of remaining caches arranged between the client and the server which are allowed to forward said request to a next cache, in case said given representation and said alternative representations are not stored;

a controlling module for checking if said given representation is stored;

a browsing module formed to browse alternative representations listed, in case said given representation is not cached.

12. The cache according to claim 11, wherein the alternative representations are browsed in order of preference.

13. The cache according to claim 11, wherein, an auxiliary directive defining a final cache arranged along the transmission path, the request is not forwarded in case:
- said given representation and said alternative representations are not stored in said cache; and
- said cache corresponds to the final cache.

14. A cache for providing a content part of a multimedia content to a client terminal, said cache being arranged along the transmission path between the client terminal and a remote server, several representations of said content part being available, comprising:
- at least one memory; and
- one or more processor configured to:
  - receive at a first cache, from the client terminal, a request for a given representation of said content part, belonging to a set of allowable representations selected among said available representations, said request further comprising a list of alternative representations of the set and an auxiliary directive for specifying a number of remaining caches arranged between the client and the server which are allowed to forward said request to a next cache, in case said given representation and said alternative representations are not stored;
  - check at said first cache if said given representation is stored in the cache;
  - in case said given representation is not cached, browse at said first cache alternative representations listed.

* * * * *